United States Patent
Müller et al.

(10) Patent No.: US 7,530,195 B2
(45) Date of Patent: May 12, 2009

(54) ELECTROCUTION ANIMAL TRAP WITH A SENDER

(75) Inventors: Frank Müller, Brøndby Strand (DK); Kim Michael Jensen, Roskilde (DK)

(73) Assignee: Ratco APS, Birkerod (DK)

( * ) Notice: Subject to any disclaimer, the term of this patent is extended or adjusted under 35 U.S.C. 154(b) by 240 days.

(21) Appl. No.: 10/530,013

(22) PCT Filed: Oct. 2, 2003

(86) PCT No.: PCT/DK03/00652

§ 371 (c)(1),
(2), (4) Date: Oct. 4, 2005

(87) PCT Pub. No.: WO2004/030450

PCT Pub. Date: Apr. 15, 2004

(65) Prior Publication Data

US 2006/0123693 A1    Jun. 15, 2006

(30) Foreign Application Priority Data

Oct. 2, 2002    (DK) ............................... 2002 01468

(51) Int. Cl.
   *A01M 23/38*    (2006.01)
(52) U.S. Cl. .................................... 43/98; 43/99; 43/58
(58) Field of Classification Search ................ 43/98, 43/99, 58
See application file for complete search history.

(56) References Cited

U.S. PATENT DOCUMENTS

| | | | | |
|---|---|---|---|---|
| 909,814 A | * | 1/1909 | Norris | 43/98 |
| 912,203 A | * | 2/1909 | Swasey | 43/98 |
| 1,029,551 A | * | 6/1912 | Molnar | 43/99 |
| 1,038,902 A | * | 9/1912 | Kruczynski | 43/99 |
| 1,044,490 A | * | 11/1912 | Cessna | 43/99 |
| 1,074,770 A | * | 10/1913 | Beardsley | 43/99 |
| 1,660,013 A | * | 2/1928 | Morawiecki | 43/99 |
| 2,161,789 A | * | 6/1939 | Wingfield | 43/98 |
| 2,229,300 A | * | 1/1941 | Montroy et al. | 43/98 |
| 2,411,766 A | * | 11/1946 | Vincent et al. | 43/99 |
| 2,465,686 A | * | 3/1949 | Hohler | 43/99 |
| 2,544,730 A | * | 3/1951 | Schulz | 43/99 |
| 2,595,130 A | * | 4/1952 | Edwards | 43/98 |
| 2,722,036 A | * | 11/1955 | Servidio | 43/98 |

(Continued)

FOREIGN PATENT DOCUMENTS

DE        3301057 A1   *   7/1984

(Continued)

*Primary Examiner*—Darren W Ark
(74) *Attorney, Agent, or Firm*—Harness, Dickey & Pierce, P.L.C.

(57) ABSTRACT

An electrically powered rodent trap which includes a surveillance system for remote surveillance of the trap so that the trap may be operated without being attended to. A rodent which enters into the trap is killed by means of electrocution electrodes. The dead rodent is automatically dispatched from the trap, e.g. by a trapdoor, into a container or reservoir beneath the trap. The number of electrocutions and possible other data is stored by an electronic system incorporated in the trap and a signal is sent out, either by request from an external unit, or automatically to an external unit. A city rodent exterminator is capable of monitoring the status of the trap from an office location and thereby effectively tend to the trap or to a series of traps.

47 Claims, 4 Drawing Sheets

U.S. PATENT DOCUMENTS

| | | | | |
|---|---|---|---|---|
| 2,763,092 A * | 9/1956 | Sheridan | | 43/99 |
| 2,775,844 A * | 1/1957 | Farrell | | 43/69 |
| 2,995,862 A * | 8/1961 | Pimentel | | 43/99 |
| 3,007,277 A * | 11/1961 | Anderson | | 43/99 |
| 3,197,916 A * | 8/1965 | Cole, Jr. et al. | | 43/98 |
| 3,936,972 A * | 2/1976 | Meyers et al. | | 43/69 |
| 4,179,839 A * | 12/1979 | Salotti et al. | | 43/98 |
| 4,205,480 A * | 6/1980 | Gartner | | 43/98 |
| 4,250,655 A * | 2/1981 | Munns | | 43/99 |
| 4,497,130 A * | 2/1985 | Fitzgerald | | 43/98 |
| 4,780,985 A * | 11/1988 | Coots | | 43/98 |
| 4,884,064 A * | 11/1989 | Meehan | | 43/58 |
| 4,890,415 A * | 1/1990 | Fressola et al. | | 43/58 |
| 4,949,500 A * | 8/1990 | Jefferys | | 43/98 |
| 4,965,959 A * | 10/1990 | Gagne | | 43/58 |
| 5,027,547 A * | 7/1991 | Livshin | | 43/98 |
| 5,040,326 A * | 8/1991 | Van Dijnsen et al. | | 43/58 |
| 5,184,416 A * | 2/1993 | Brewer | | 43/98 |
| 5,269,091 A * | 12/1993 | Johnson et al. | | 43/98 |
| 5,369,907 A * | 12/1994 | Lee | | 43/98 |
| 5,406,742 A * | 4/1995 | Allen | | 43/98 |
| 5,497,576 A * | 3/1996 | Nowak | | 43/58 |
| 5,918,409 A * | 7/1999 | Carnwath | | 43/99 |
| 5,949,636 A * | 9/1999 | Johnson et al. | | 43/98 |
| 5,953,853 A * | 9/1999 | Kim | | 43/98 |
| 6,088,948 A * | 7/2000 | R.o slashed.nnau | | 43/72 |
| 6,202,340 B1 * | 3/2001 | Nieves | | 43/61 |
| 6,445,301 B1 * | 9/2002 | Farrell et al. | | 43/58 |
| 6,609,328 B2 * | 8/2003 | Swift et al. | | 43/98 |
| 6,735,899 B1 * | 5/2004 | Anderson et al. | | 43/98 |
| 6,739,086 B1 * | 5/2004 | Lamb | | 43/99 |
| 6,775,946 B2 * | 8/2004 | Wright | | 43/61 |
| 6,775,947 B2 * | 8/2004 | Anderson et al. | | 43/98 |
| 6,796,081 B2 * | 9/2004 | Anderson et al. | | 43/98 |
| 6,836,999 B2 * | 1/2005 | Rich et al. | | 43/98 |
| 7,010,882 B2 * | 3/2006 | Rich et al. | | 43/98 |
| 7,026,942 B2 * | 4/2006 | Cristofori et al. | | 43/58 |
| 7,219,466 B2 * | 5/2007 | Rich et al. | | 43/98 |
| 7,317,399 B2 * | 1/2008 | Chyun | | 43/58 |
| 2003/0160699 A1 * | 8/2003 | Trompen | | 43/124 |
| 2003/0213161 A1 * | 11/2003 | Gardner et al. | | 43/61 |
| 2003/0218543 A1 * | 11/2003 | Gardner et al. | | 43/132.1 |
| 2005/0097808 A1 * | 5/2005 | Vorhies et al. | | 43/61 |
| 2005/0151653 A1 * | 7/2005 | Chan et al. | | 43/58 |
| 2006/0150470 A1 * | 7/2006 | Ronnau | | 43/58 |
| 2007/0209270 A1 * | 9/2007 | Rich et al. | | 43/98 |
| 2008/0236023 A1 * | 10/2008 | Thomas et al. | | 43/58 |

FOREIGN PATENT DOCUMENTS

| | | | |
|---|---|---|---|
| DE | 3309464 A1 * | 10/1984 | |
| DE | 3326267 A1 * | 2/1985 | |
| DE | 19954142 A1 * | 5/2001 | |
| EP | 283142 A1 * | 9/1988 | |
| EP | 395135 A1 * | 10/1990 | |
| EP | 0 990 389 A | 4/2000 | |
| EP | 990389 A1 * | 4/2000 | |
| EP | 1 059 031 A | 12/2000 | |
| FR | 2689371 A1 * | 10/1993 | |
| FR | 2 758 435 | 7/1998 | |
| GB | 2107164 A * | 4/1983 | |
| GB | 2354693 A * | 4/2001 | |
| JP | 01312953 A * | 12/1989 | |
| JP | 07163286 A * | 6/1995 | |
| JP | 11276053 A * | 10/1999 | |
| JP | 2001161248 A * | 6/2001 | |
| JP | 2001231429 A * | 8/2001 | |
| JP | 2002000160 A * | 1/2002 | |
| WO | WO 9701262 A1 * | 1/1997 | |
| WO | WO 9848620 A1 * | 11/1998 | |
| WO | WO 9918780 A1 * | 4/1999 | |
| WO | WO 2007024143 A2 * | 3/2007 | |
| WO | WO 2007123755 A2 * | 11/2007 | |

* cited by examiner

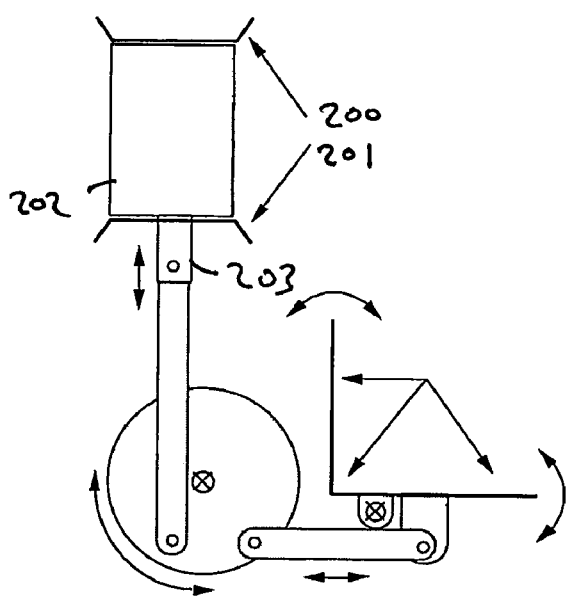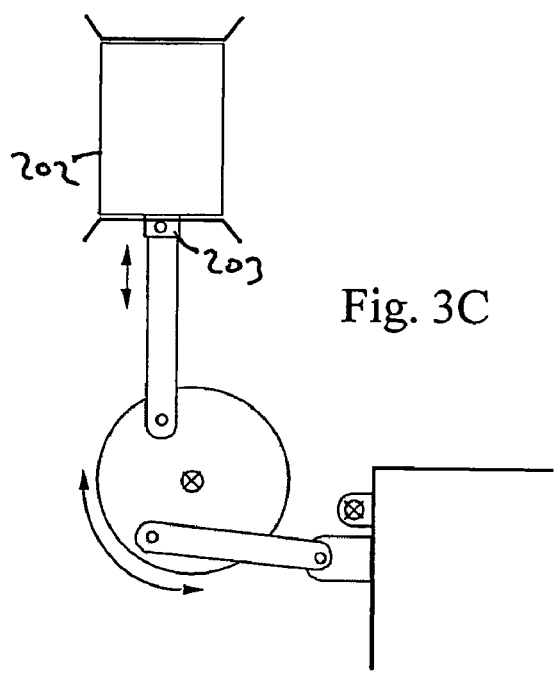
Fig. 3C
Fig. 3B

ELECTROCUTION ANIMAL TRAP WITH A SENDER

FIELD OF THE INVENTION

The present invention relates to a device for trapping and dispatching small animals such as rats and mice through electrocution. In particular, the invention relates to a trap which can operate without being attended to.

DESCRIPTION OF PRIOR ART

The extermination of noxious animals is a well-known problem. In a common approach the noxious animals are captured and killed in a trap. Several types of traps have been developed. The present invention deals with a trap, wherein the executing means is electrocution. In an electrocuting trap the animal is killed by an electrical current that is drawn through the body of the captured animal. Several types of electrocution traps have already been described, for example in the patents U.S. Pat. Nos. 1,038,902; 5,918,409; 5,949,636 and in the application FR 2 758 435-A1. In such traps a bait or lure is placed inside a housing with one or more entrances. Between the entrance(s) and the bait a configuration of electrodes is present. The inside of the trap is designed in such a way that, if an animal tries to reach the bait, the animal inevitably touches the electrodes and thereby gets electrocuted.

None of the previously described traps, however, deal with the situation where regular control of the traps is inconvenient. Such situations can be encountered if the trap is located at a place, which is difficult to access. Or, if a large number of traps are in operation, e.g. in a city-extermination program, where a network of traps are placed in a sewer system. Surveillance of such a trap system requires considerable efforts, if all traps have to be monitored by subsequently checking all traps one at a time.

DESCRIPTION OF THE INVENTION

In a first embodiment, the above mentioned problem has been solved by the present invention by providing an electrically powered animal trap, which comprises
 a set of electrodes for electrocution of the animal, and
 means for communicating a surveillance signal between the trap and an external surveillance unit.

Due to the means for communicating a surveillance signal between a trap and an external unit, the keeper of the trap may know the condition of the trap without direct inspection of the trap. The trap may thus be left unattended for a long period time, where the trap keeper can rest assure, that the trap is fully operational.

The trap may comprise a bottom section with an upwardly extending sidewall, a top section, and at least one entrance. The entrance may be either in a sidewall, in the top section of the trap, in the bottom section of the trap, or anywhere else. Upon entering the trap, the animal enters a chamber, where a bait or lure may be placed in the opposite side of the chamber. The set of electrodes may comprise at least two electrodes, e.g. placed between the entrance and the end section where bait can be placed. The bait may be a liquid dripping in a controlled way, which ensures a continuous supply of strong scent, it may be in the form of dry pills or tablets, it may be food, or it may be a scent means. A bait storage arrangement may be provided, this may enable automatically feeding the bait to a trough, and furthermore control the flow of the bait from a storage to ensure optimal dosing. The surface of the electrodes may be rough. e.g. by adhering metal or plastic shavings to a metal plate in any conventional way, e.g. plastic composites incorporating metal conductive wires or shavings. Another possibility for making the electrode surfaces rough, is by using powder metallurgy. However, smooth surfaces of the electrodes may also be provided. In case three electrodes are used, the electrodes may be interconnected in a way such that a first of the electrodes is connected to a second of the electrodes and wherein a third of the electrodes is electrically insulated from the first and second electrodes. A small voltage up to 4,5 V DC may be maintained between the two first electrodes and the third. The source may be a small accumulator, such as a 12 V motorcycle battery. An electronic circuit (a sensor circuit) may be adapted to detect a leak current between the first and the third electrode by detecting the presence of a finite resistance. This will happen when an animal is touching electrode 1, at the same time as it is touching electrode 3. A high-voltage potential difference between the first and the third electrode should then be generated by an additional "power electronics", which can be incorporated with the sensor circuit. The result is that the animal is electrocuted. The high-voltage potential may be in the form of a continuous voltage maintained for a predefined time, or it may be in the form of a series of pulses. The use of pulses may be advantageous, as the animal may be killed faster and less painfully. These pulses may have the form of steps, where each step comprises different voltages kept for different time periods. The pulses may also be in the form of a sinusoidal wave, or it may be a series of short pulses. The electronic circuit may be made in a versatile way where these aspects can be adjusted electronically. Alternatively, only two electrodes may be used.

The trap may comprise additional or different means for detecting the presence of an animal by equipping the trap with a weight sensitive detector, a motion sensitive detector, which may be achieved by using one or more infrared sensors, or a lever arm. These means may be added in order to increase the certainty that an animal is present in the trap, before the high-voltage potential is generated, or they may be used as alternative means for detecting the presence of an animal.

The trap may be equipped with an exit for removing the electrocuted animal into a receptacle. This receptacle may be an open receptacle as a sewer or a small stream of water into which the dead animal may be dumped by e.g. using a trapdoor in the bottom of the trap. To accommodate a trap in such a situation, the trap may be equipped with lifting means to lift up the trap. The lifting means may be one or more legs that are adjustable in length, for example telescopic legs, i.e. legs where a single or a series of thinner legs are sliding inside a thicker leg, and where a specific length can be maintained by a fixing means. The adjustment of the length of these legs can be facilitated by using pressurized gas in a similar manner as with office chairs. The receptacle may likewise be a sealed container on top of which the trap is fastened. The container may be equipped with a bag in which the dead animals are collected. A bag will ensure easy and hygienic emptying of the trap as no physical contact with the dead animals is needed. The receptacle may contain a chemical bath for dissolving the animal.

The trap is fully automatic and controlled by the electronic circuit. The exit can be actuated either electrically, hydraulically, pneumatically, mechanically or by any combination of these. For example a trapdoor where the locking-unlocking is an electromagnetic tap which unlocks the trapdoor when the electrocution has finished. The trapdoor can be fastened to the trap by a pivotal hinge at one side such that the door opens upon the weight of the dead animal, and tips back due to a counter weight. In another design the trapdoor is also attached at one side with a pivotal hinge, but in this case the opening and closing is controlled by a motor which unrolls and rolls up a piece of string. It is also possible to place the hinges at opposite sides of the trapdoor, such that the trapdoor tips around an axis perpendicular to the axis around which, the trapdoor tip when the hinges are places in the same side of the trapdoor.

As the trap may be raised above the surroundings, an entrance ramp may be needed. The ramp may be constructed in wood. But it may likewise be constructed in plastic, stainless steal, nickel or any suitable material.

As the inside of an electrocution trap may be dangerous to touch, a tube or a flexible hose may be mounted in front of the trap entrance. By using a bent tube (or a flexible hose), e.g. an s-form, an elbow form or a zigzag form, a child will not be able to get its arm inside the trap. A trap which has such a mount placed in front of the entrance is therefore a lot safer to place in areas where children may play than other types of traps. The entrance may also be equipped with a clipping means, thereby enabling to clip on and use any suitable material as entrance.

A battery can only supply a limited number of electrocutions before it needs to be recharged. The trap may therefore be equipped with a power adapter that allows connection directly to a power grid. Some traps may be placed at locations where it is not possible to directly connect the trap to a power grid. In this case the trap can be equipped with a chargeable battery.

The trap may be able to stand flooding or high water levels if, e.g., it is located in a sewer. This may be achieved by embedding the electronics in a waterproof housing, and furthermore by incorporating a water detector that may transmit an electronic signal, e.g. in the case the water level rises above a predetermined level. The electronic circuit may be adapted to react in response to a signal from the water detector, by disabling the generation of the high-voltage potential. The water detector may comprise a timer detecting at predetermined time interval whether or not high voltage generation may be performed, or whether or not it may be safe to switch on the electronics.

The electronic circuit could comprise means for storing an identification code for the trap, and/or information relating to the number of captured animals, the remains of the bait, and the battery condition. A display could be included in the electronic circuit, such that the above mentioned trap information may easily be read-out. The electronic circuit could furthermore comprise means for sending out a wireless electromagnetic surveillance signal that may be received and read by an external unit. The signal may comprise the above mention features and may only send out upon receiving a request signal from the external unit, thereby avoiding draining the battery. A surveillance signal may also automatically be sent out in the case of a capture, in the case of low battery power or in the case of loss of bait. The surveillance signal may be any electromagnetic signal, such as a radio-signal, or a signal around 2,4 GHz which is the Bluetooth standard frequency, or a signal in the low frequency domain, such as few hundred KHz. The trap may additionally comprise means for determining the geographical position of the trap. This may be achieved by incorporation a global positioning system devise (GPS), a mobile positioning system device (MPS), such technology has been demonstrated by the Swedish corporation Ericsson, or a Nordic Mobile Telephone (NMT) device. The surveillance signal can therefore further comprise the position of the trap. The electronic circuit may also be equipped with a means for receiving a command signal send out by the external unit. This would be useful if, for example, the trap is further equipped with a size adjustable entrance opening.

Above, only the situation of a single trap is described. An ensemble of traps may be monitored by a software program adapted to store information on the identity code, the position, etc., of the individual traps in the network. The software should collect information about the number of captures, the condition of the bait, and the current power on the battery. A trap keeper could then fast obtain an overview of the traps that are needed to be tended to.

BRIEF DESCRIPTION OF THE DRAWINGS

In the following, a preferred embodiment of the invention will be described with reference to the drawing in which:

FIG. 3A-3C are preferred embodiments of a trapdoor,

DETAILED DESCRIPTION OF THE FIGS

Figure 1A:
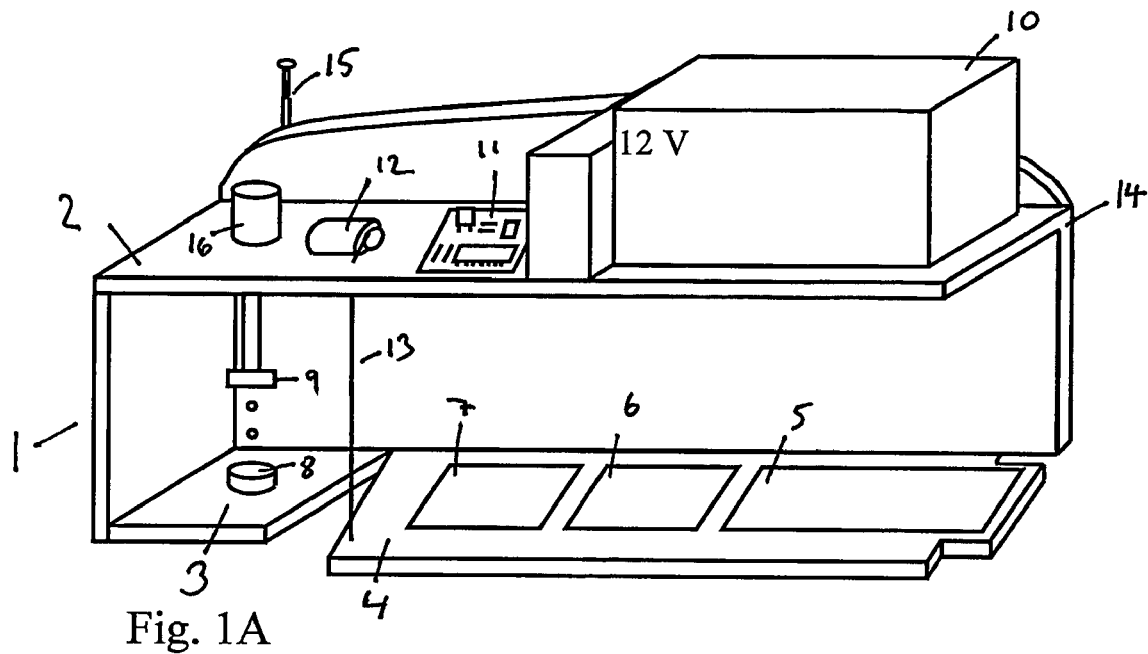
FIG. 1A and 1B are 3D cut of preferred embodiments of the invention.

In FIG. 1A, a 3D cut of a preferred embodiment of the present invention is presented. The trapping chamber is inside a housing which comprises sidewalls 1, a top 2 and a bottom section 3,4. The access to the trapping chamber is an opening in one end of the trap housing. The entrance is not shown, but it could be an opening in a wall adjacent to the sidewall 14. The bottom section 3, 4 comprises two parts, one part 3 which is fixed with respect to the housing as a whole, and another part which is movable. The movable part 4 constitutes an exit, here illustrated as a trapdoor that opens in a downward direction. A set of electrodes comprising a first electrode 5, a second electrode 6 and a third electrode 7, are placed sequentially between the entrance and the section where the bait 8, 9 and 16 is placed. From the bait reservoir 9, a scent-liquid is dripping into a small bowl 8. The bait reservoir may be re-filled from outside the trap 16, as the reservoir protrudes through the top section of the trap. The power source of the trap is a 12 V DC battery 10, placed on top of the trap. An electronic circuits 11 is also placed on top of the trap. The electronic circuit includes a means for communicating a surveillance signal. The surveillance signal is transmitted through the antenna 15. The opening and closing of the trapdoor is actuated by a small motor 12 adapted to unroll and roll up a string in order to open and close the trapdoor.

The electronic circuit 11 comprises:
1. an electronic-print card with a microprocessor, a sensor circuit, a "power electronic" to drive the motor and the high voltage generator,
2. a motor to remove the animal from the trap chamber,
3. a display, and
4. a transmission system to remote read-out.

The sensor circuit is set to detect a leak current between the first electrode 5 and the third electrode 7, alternatively, between the second electrode 6 and the third electrode 7, by detecting a finite resistance between the electrodes. It can be adjusted electronically to register a resistance between 2 k$\Omega$ and 500 k$\Omega$. The electrodes are kept at a potential of maximal 4.5 V DC between captures. In case of a detection of a finite resistance between the first electrode 5 (or the second electrode 6) and 7, an electrocuting high-voltage potential is generated between the same electrodes. The duration of the high-voltage potential can be adjusted electronically from 100 ms and up to permanent, with an output voltage between 500 V and 4 kV, and a transmitted power between 100 mW and 25 W. The potential change uses that the inductivity in the transformer when the period for the high voltage transformer is short. The duration is controlled by the microprocessor. The power in the electrocuting-process is changed by changing the duty-cycle of the voltage transformer, the total power admitted is thereby controlled. Also the electrocuting voltage can be varied, one example is given in FIG. 2. The details of the variation in the voltage difference can be further elaborated upon using experience gained in experiments. The power-electronics control the motor, both with respect to speed, and with respect to the time the exit remains open. A circuit can be added which register when the motor stalls. A display shows the number of electrocutions, the remaining amount of the bait as well as the current voltage on the accumulator. The transmission system should be of the wire-loop principle, as this does not require broadcasting approval. Furthermore, this type of system works at low frequencies and can be used to transmit through earth and water.

Figure 1B:
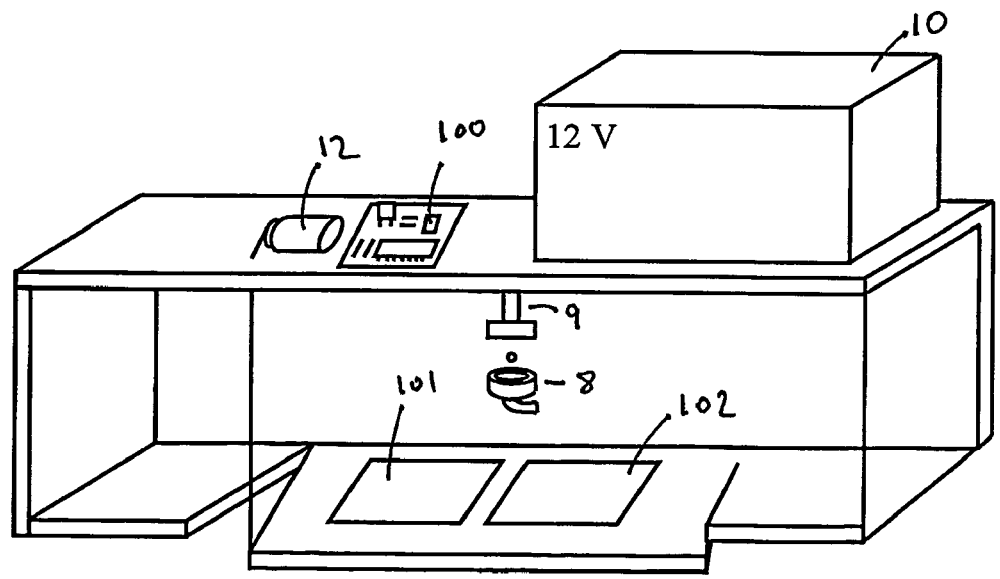

In FIG. 1B, the trap as described in connection with FIG. 1A is slightly modified. Here the bait reservoir 9 and a the small bowl 8 are positioned in the central region of the trap. The presence of an animal is detected using an infrared sensor 100, and only two electrocuting electrodes 101, 102 are used.

Figure 2:
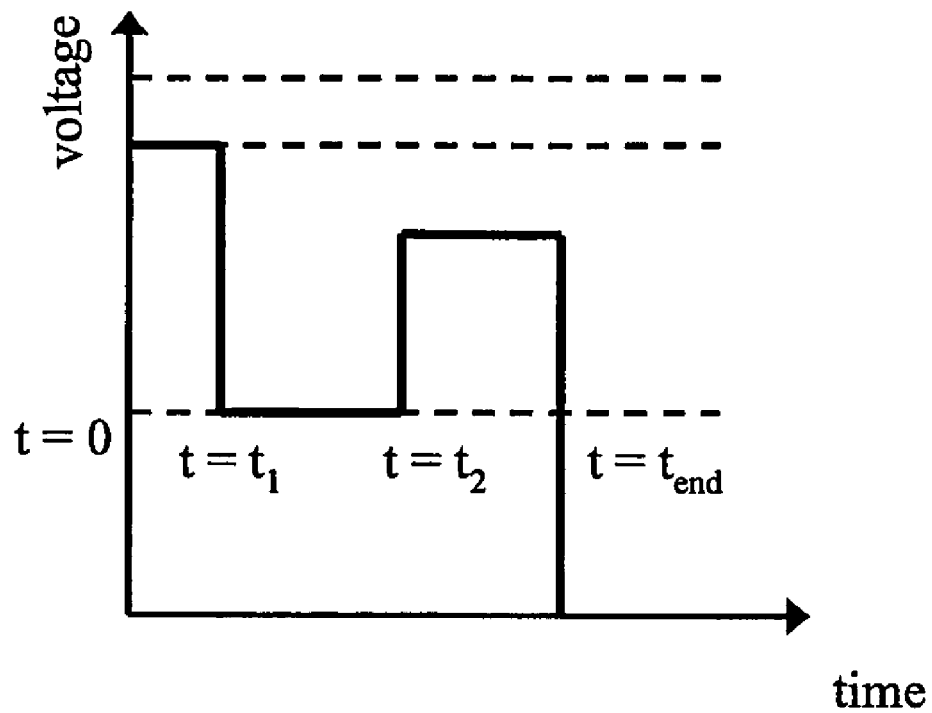
FIG. 2 is an example of a voltage diagram.

FIG. 2 gives an example of the voltage difference between first electrode 5 and the third electrode 7, or between electrode one 101 and two 102, versus time during the electrocuting process. At t=0 the electrocuting voltage difference is generated. At t=$t_1$ the voltage difference drops to a predefined level which is kept until t=$t_2$ where the voltage difference is raised until a new pre-defined level. At t=$t_{end}$ the voltage difference is set to zero.

Figure 3A:
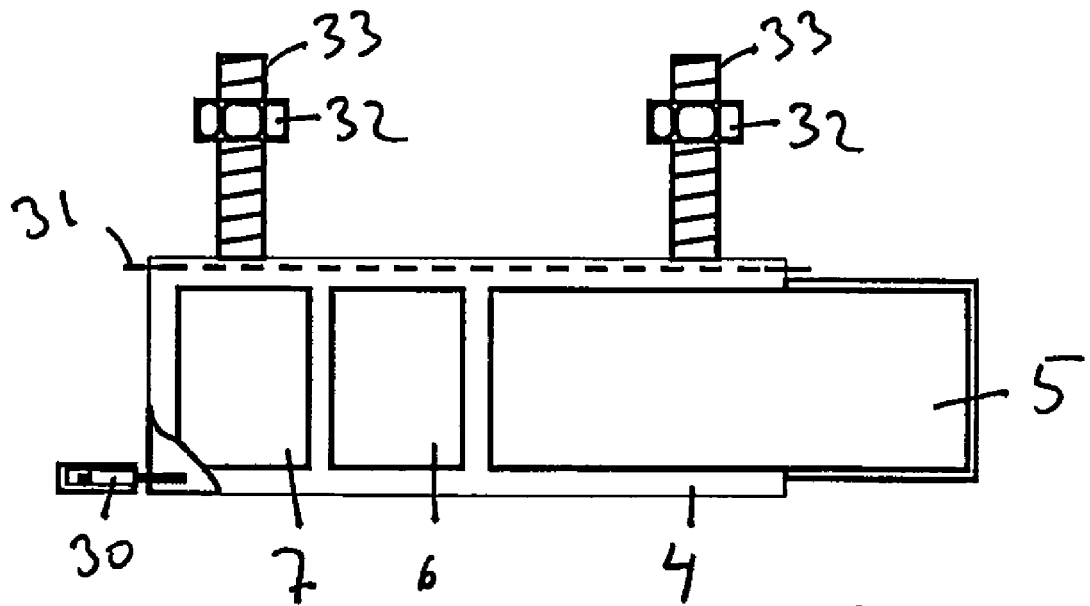

FIG. 3A shows a second embodiment of the trapdoor 4, where instead of using a motor 12 and a string 13, the actuation of the trapdoor is an electromagnetic switch 30 adapted to open upon a signal from the electronic circuit 11. Due to the weight of the electrocuted animal, the trapdoor opens by pivoting around a pivot tap 31, and closes after release of the animal due to counter weights, here exemplified by a threaded bolt 33 and a nut 32.

In FIG. 3B and 3C a third embodiment of the trapdoor is shown. Here a solenoid 202 Is used to open and close the trapdoor. The solenoid may be fixed to the trap using fixation means 200 and 201. By activating the solenoid, rod 203 is pulled into the solenoid, which through a mechanical coupling to the trapdoor, opens the trap door, as shown in FIG. 3C.

Using a solenoid may e.g. increase the control of the trapdoor. For example it may be possible to shake the trapdoor to make sure the animal has fallen off, or to clear the trapdoor from debris or dirt on the electrodes or the trapdoor in general.

Figure 4:
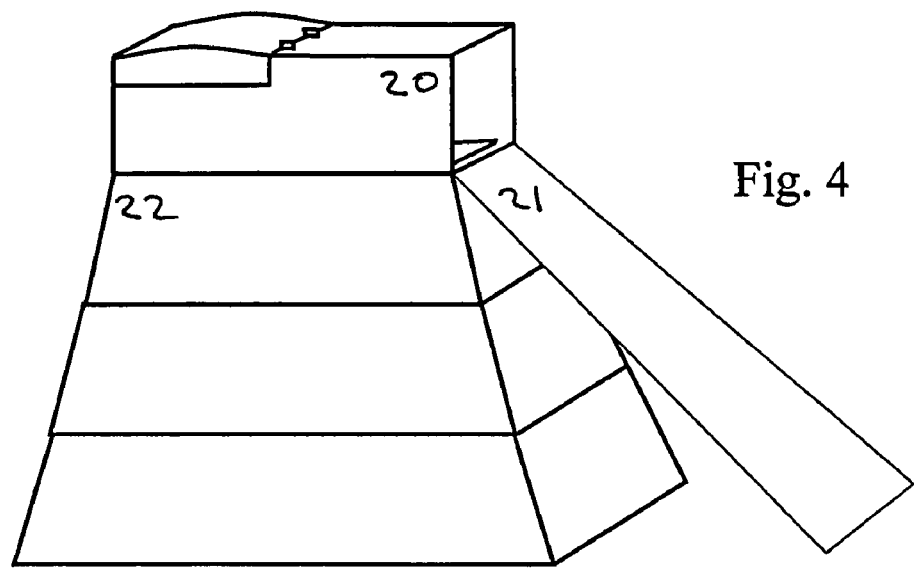
FIG. 4 illustrates the invention in connection with a closed receptacle.
Figure 5:
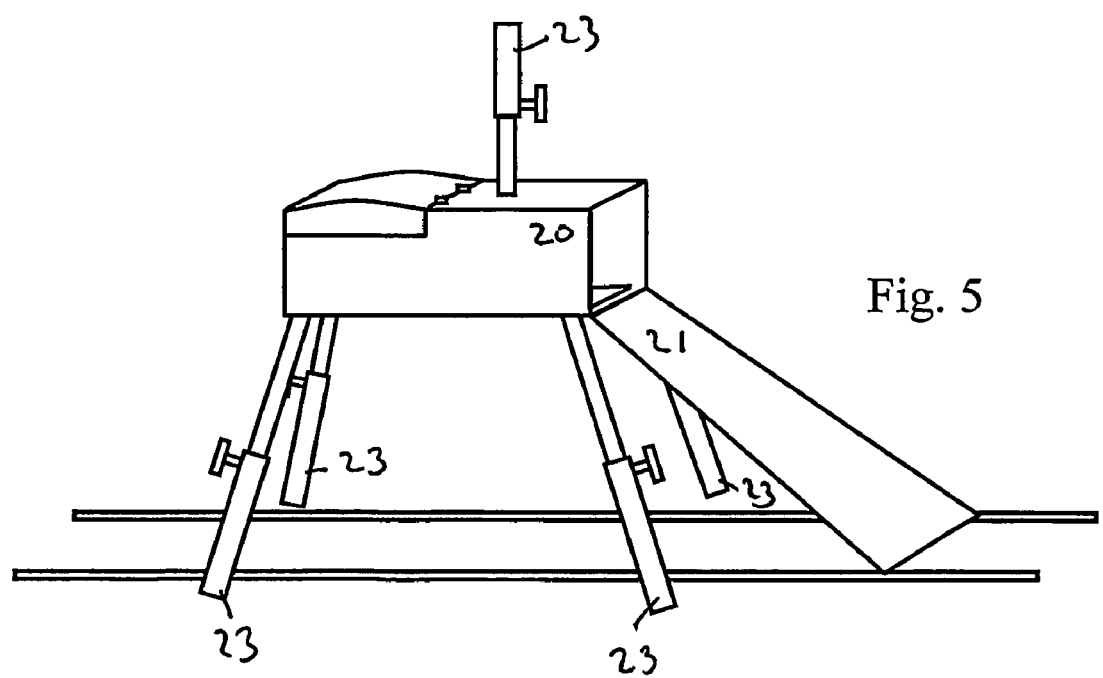
FIG. 5 illustrates the invention mounted in a sewer.

FIG. 4 and 5 show two examples of trap set-ups. In both Figs. the trap 20 is raised above the surroundings, and access to the trap chamber is ensured by a ramp 21. In FIG. 2 the trap is placed on top of a receptacle 22, into which the animals are dumped after the electrocution. Where FIG. 4 present a trap set-up that can be used in many different locations, e.g. a store-house, a barn or a field, FIG. 5 envision a special case where the trap is placed directly above a sewer stream. In this situation the sewer it-self is used as a receptacle where the animals are dumped directly into after electrocution. The trap is fastened in the sewer by using length adjustable legs 23. In FIG. 5 the trap is positioned along the sewer, however, the trap may also be positioned so that it bridges the water stream, i.e. positioned rotated 90 degrees with respect to the one shown.

The invention claimed is:

1. An electrically powered animal trap, comprising:
a set of electrodes for electrocution of an animal, and
a device for communicating a surveillance signal between the trap and an external surveillance unit,
wherein the trap defines a chamber between an entrance and an end section thereof, the end section supports arrangement of a bait in the form of a scent source, the set of electrodes including a number of electrodes being at least three and the electrodes being arranged sequentially in the chamber, a first electrode of the at least three electrodes being connected to a second electrode of the at least three electrodes while a third electrode of the at least three electrodes being electrically isolated from the first and second electrodes, the electrocution occurs when a high-voltage potential difference between the first and third electrodes is generated, and a surface of the electrodes being rough.

2. The trap according to claim 1, further comprising:
a bottom with an upwardly extending sidewall,
a top section, and
an exit.

3. The trap according to claim 2, wherein a size of the entrance is adjustable.

4. The trap according to claim 3, wherein the size of the entrance is adjustable via the device for communicating a surveillance signal.

5. The trap according to claim 1, further comprising a device for lifting up the trap.

6. The trap according to claim 5, wherein the device for lifting includes at least one leg.

7. The trap according to claim 6, wherein the at least one leg is adjustable in length.

8. The trap according to claim 7, wherein an adjustment of the length of the at least one leg is actuated by pressurized gas.

9. The trap according to claim 6, wherein the at least one leg comprises telescopic legs.

10. The trap according to claim 1, further comprising a receptacle for storing the electrocuted animals.

11. The trap according to claim 10, wherein the receptacle and the trap are sealed.

12. The trap according to claim 1, further comprising the electronic circuit including at least one micro processor, wherein the electronic circuit is adapted to generate the high-voltage potential difference from a low voltage power source upon detection of an animal.

13. The trap according to claim 12, wherein the animal is detected by an electronic detector connected to the electronic circuit.

14. The trap according to claim 13, wherein the electronic detector is adapted to detect motion of an animal.

15. The trap according to claim 13, wherein the electronic detector is adapted to detect a weight of an animal.

16. The trap according to claim 12, wherein the high-voltage potential difference is generated in pulses.

17. The trap according to claim 16, wherein the pulses are in the form of a sinusoidal wave, a step pulse, or a series of pulses.

18. The trap according to claim 12, wherein the power source for generating the high-voltage potential difference is a low voltage, high capacity DC-battery.

19. The trap according to claim 12, further comprising a battery charger.

20. The trap according to claim 12, wherein the electronic circuit stores an identification code for the trap.

21. The trap according to claim 1, wherein a roughness of the surface is provided by adhering metal shavings to a metal plate.

22. The trap according to claim 1, wherein the high-voltage potential difference is generated upon detection of a leak current through the animal between the first and second electrodes.

23. The trap according to claim 1, further comprising a lever arm for detecting a presence of the animal.

24. The trap according to claim 23, wherein the high-voltage potential difference is generated when an animal moves the lever arm.

25. The trap according to claim 1, further comprising an entrance ramp.

26. The trap according to claim 25, wherein the ramp is made from a material selected from the group consisting of: wood, plastic, stainless steel and nickel.

27. The A trap according to claim 1, further comprising a mount at the entrance such that an additional section can be mounted in front of the entrance.

28. The trap according to claim 27, wherein the mount comprises an entrance tube.

29. The trap according to claim 28, wherein the tube has at least one bend.

30. The trap according to claim 28, wherein said tube possesses one of the following shapes: an s-form, an elbow, and a zigzag.

31. The trap according to claim 1, further comprising a power adapter that allows direct connection to an existing power network.

32. The trap according to claim 31, wherein the power adapter is compatible with an input voltage with an AC-amplitude between about 110 to 380 V.

33. The trap according to claim 2, wherein the exit is operated automatically upon electrocution of the animal.

34. The trap according to claim 33, wherein the exit is actuated either electrically, hydraulically, pneumatically, mechanically or by any combination of these.

35. The trap according to claim 2, wherein the exit is a trapdoor.

36. The trap according to claim 1, wherein the set of electrodes are shielded from water flooding from above.

37. The trap according to claim 12, wherein the electronic circuit is embedded in a waterproof housing.

38. The trap according to claim 12, further comprising a water-level detector adapted to send out an electronic signal when water is detected in a level above a predetermined level, and wherein the electronic circuit is adapted to react in response to an electronic signal from the water level detector by disabling the generation of the high-voltage potential difference.

39. The trap according to claim 1, wherein the device for communicating a surveillance signal comprises a device for transmitting a wireless signal to the external surveillance unit provided with a receiver for receiving the a surveillance signal.

40. The trap according to claim 39, wherein the wireless signal is an electromagnetic signal.

41. The trap according to claim 40, wherein the electromagnetic signal is a radio-signal.

42. The trap according to claim 40, wherein a frequency of the electromagnetic signal is in the range of about 2.2 to 2.8 GHz.

43. The trap according to claim 1, further comprising a receiving unit for receiving a command signal from the external unit.

44. The trap according to claim 1, wherein the surveillance signal is only sent out upon receiving a request signal.

45. The trap according to claim 1, further comprising a device for determining a geographical position of the trap.

46. The trap according to claim 1, wherein the surveillance signal contains information about at least one of the following particulars:
   a number of captured animals,
   a condition of a battery,
   a remains of the bait, a position of the trap, and/or
   an identification code for the trap.

47. A trap system, comprising:
   at least one trap according to claim 1, and
   at least one external unit including:
      a communication device for receiving a surveillance signal from the trap and optionally, for transmitting a command signal to the trap, and
      a computer processing device adapted to respond to commands provided by computer software to read a status of either a single trap or an ensemble of traps.

* * * * *